(12) United States Patent
Onsrud

(10) Patent No.: US 7,272,882 B1
(45) Date of Patent: Sep. 25, 2007

(54) MULTIPLE TABLE ROUTING MACHINE WITH ROLLER HOLD-DOWN

(75) Inventor: Thomas Onsrud, Mooresville, NC (US)

(73) Assignee: C. R. Onsrud, Inc., Troutman, NC (US)

( * ) Notice: Subject to any disclaimer, the term of this patent is extended or adjusted under 35 U.S.C. 154(b) by 0 days.

(21) Appl. No.: 11/703,951

(22) Filed: Feb. 8, 2007

Related U.S. Application Data

(60) Provisional application No. 60/767,093, filed on Mar. 2, 2006.

(51) Int. Cl.
*B23C 1/06* (2006.01)
*B23P 23/00* (2006.01)

(52) U.S. Cl. .................. 29/564; 409/212; 409/163; 409/158; 409/189; 409/132; 408/88; 408/95

(58) Field of Classification Search ............... 409/202, 409/212, 163, 158, 189, 197, 205, 225, 131–132; 408/88, 95; 29/564
See application file for complete search history.

(56) References Cited

U.S. PATENT DOCUMENTS

| | | | |
|---|---|---|---|
| 3,650,178 A * | 3/1972 | Appleton .................... 409/202 |
| 4,382,728 A * | 5/1983 | Anderson et al. ........... 409/137 |
| 4,537,234 A | 8/1985 | Onsrud |
| 4,610,582 A | 9/1986 | Amos et al. |
| 4,920,495 A * | 4/1990 | Pilkington ................... 700/195 |
| 5,107,910 A * | 4/1992 | Sasaki ......................... 144/48.1 |
| 5,163,793 A * | 11/1992 | Martinez ..................... 409/205 |
| 5,230,594 A * | 7/1993 | Pilkington ................... 409/197 |
| 5,323,821 A * | 6/1994 | Suzuki ........................ 144/48.1 |
| 5,407,415 A * | 4/1995 | Spishak .......................... 483/4 |
| 5,429,461 A * | 7/1995 | Mukherjee et al. ......... 409/163 |
| 5,468,101 A * | 11/1995 | Shoda ......................... 409/202 |
| 5,524,328 A | 6/1996 | Hardesty |
| 6,092,446 A | 7/2000 | Hardesty |
| 6,502,002 B2 | 12/2002 | Sunsnjara et al. |
| 6,626,617 B2 * | 9/2003 | Lorber et al. ............... 409/132 |
| 6,832,879 B2 * | 12/2004 | Wassmer ..................... 409/197 |
| 7,134,817 B2 * | 11/2006 | Kado et al. ................. 409/137 |

* cited by examiner

*Primary Examiner*—Erica Cadugan
(74) *Attorney, Agent, or Firm*—Adams Evans P.A.

(57) ABSTRACT

A routing machine including a plurality of worktables for supporting at least a first workpiece and a second workpiece, a hold down assembly, and a toolhead assembly for machining the first workpiece on one of the worktables and then machining the second workpiece on another of the worktables. The hold down assembly traverses the worktables with the toolhead assembly to retain the first workpiece on the one worktable and then retain the second workpiece on the other of the worktables such that the first workpiece on the one worktable can be removed and replaced with a new workpiece while the toolhead assembly machines the second workpiece on the other table. A method of machining parts with the routing machine is also disclosed.

15 Claims, 4 Drawing Sheets

MULTIPLE TABLE ROUTING MACHINE WITH ROLLER HOLD-DOWN

This application claims the benefit of U.S. provisional application No. 60/767,093, filed Mar. 2, 2006.

TECHNICAL FIELD AND BACKGROUND

The present invention relates to the field of routing machines. In particular, the invention relates to a routing machine having multiple tables and roller hold-downs.

Routing machines are typically used in the woodworking, plastics, and aerospace industries. The routing machines may be used to cut or carve patterns in a workpiece or to form a workpiece into a desired structure, such as a frame for upholstered furniture or any other item cut from sheet goods.

Routing machines used in industrial applications typically have a table supported by a base member and a tool head assembly supported on a beam. The table may be moveable with respect to a stationary beam or a moveable beam may be moveable with respect to a stationary table or both may move relative to each other. Workpieces are typically secured in position on the table by a vacuum or by rollers that press the workpiece against the table.

One disadvantage of prior art routing machines is that they do not allow a continuous manufacturing process. Typically, these routing machines only have one table. Thus, the routing machine is stopped to allow a finished workpiece to be removed and a new workpiece to be positioned on the table. Other routing machines that do have more than one table do not incorporate rollers to hold a workpiece in position on the table.

Accordingly, there is a need for a routing machine that uses roller hold-downs and multiple tables to allow a continuous manufacturing process.

SUMMARY OF THE DISCLOSURE

Therefore it is an object of the invention to provide a routing machine that has multiple worktables and roller hold-down assemblies for securing a workpiece in position on a worktable.

It is another object of the invention to provide a routing machine that allows a continuous manufacturing process.

These and other objects of the present invention are achieved in the preferred embodiments disclosed below by providing a routing machine including a plurality of worktables for supporting at least a first workpiece and a second workpiece, a toolhead assembly for machining the first workpiece on one of the worktables and then machining the second workpiece on the other of the worktables, and a hold down assembly for traversing the worktables with the toolhead assembly to retain the first workpiece on the one worktable and then retain the second workpiece on the other of the worktables such that the first workpiece on the one worktable can be removed and replaced with a new workpiece while the toolhead assembly machines the second workpiece on the other table.

According to another preferred embodiment of the invention, the hold down assembly comprises a roller for retaining a workpiece on the worktables.

According to another preferred embodiment of the invention, the roller is rotatably connected to actuation means for raising and lowering the roller.

According to another preferred embodiment of the invention, the hold down assembly is mounted on a platform connected to a leg section.

According to another preferred embodiment of the invention, the worktables are stationary.

According to another preferred embodiment of the invention, the routing machine includes a gantry including a beam supported on opposing sides by a pair of spaced-apart leg sections.

According to another preferred embodiment of the invention, the spaced-apart leg sections straddle a base member to cooperate with opposing trackways allowing the gantry to move along a longitudinal axis of the base member.

According to another preferred embodiment of the invention, a routing machine includes a plurality of work tables disposed end to end on a base member for supporting at least a first workpiece and a second workpiece. The machine also includes a gantry including a pair of spaced-apart leg sections straddling the base member and cooperating with a pair of opposing trackways permitting the gantry to move back and forth along a longitudinal axis of the base member to traverse the work tables. A toolhead assembly machines the first workpiece on one of the tables and then the second workpiece on another of the tables, and a pair of opposing hold down assemblies, each including a pair of rollers rotatably connected to actuation means for raising and lowering the rollers with respect to the work tables, retain and release workpieces from the worktables. The hold down assemblies are for traversing the worktables with the toolhead assembly disposed between the pair to retain the first workpiece on the one worktable and then retain the second workpiece on the other of the worktables. Thus, the first workpiece can be removed from the one work table and replaced with a different workpiece while the toolhead assembly machines the second workpiece on the other table.

According to another preferred embodiment of the invention, a method of machining parts includes the steps of providing a routing machine including, a first, second, and third worktables disposed end to end on a base member for supporting a first, second, and third workpieces. The routing machine further includes a gantry including a pair of spaced-apart leg sections straddling the base member and cooperating with a pair of opposing trackways for moving the gantry back and forth along a longitudinal axis of the base member to traverse the worktables. A toolhead assembly carried by the gantry machines the first workpiece on the first worktable, the second workpiece on the second worktable, and then the third workpiece on the third worktable. The machine also includes a pair of opposing hold down assemblies, each including a pair of rollers rotatably connected to actuation means for raising and lowering the rollers with respect to the work tables to retain the workpieces on the worktables. The hold down assemblies are for traversing the worktables with the toolhead assembly disposed between the pair to first retain the first workpiece on the first worktable and then retain the second workpiece on the second worktable such that the first workpiece can be removed from the first worktable and replaced with a different workpiece while the toolhead assembly machines the second workpiece on the second worktable.

The method further includes retaining the first workpiece in position on the first worktable with the pair of hold down assemblies, machining the first workpiece with the toolhead assembly, retaining the second workpiece in position on the second worktable with the pair of hold down assemblies, and machining the second workpiece with the toolhead assembly while replacing the first workpiece with a different workpiece.

According to another preferred embodiment of the invention, the method includes the step of machining the retaining the third workpiece in position on the third worktable with the hold down assemblies.

According to another preferred embodiment of the invention, the method includes the step of machining the third workpiece with the toolhead assembly while replacing the second workpiece with a different workpiece.

According to another preferred embodiment of the invention, the method includes the step of machining the different workpiece replacing the first workpiece with the toolhead assembly while replacing the third workpiece.

BRIEF DESCRIPTION OF THE DRAWINGS

The invention may be best understood by reference to the following description in conjunction with the accompanying drawing figures in which.

DESCRIPTION OF PREFERRED EMBODIMENTS

Figure 1:
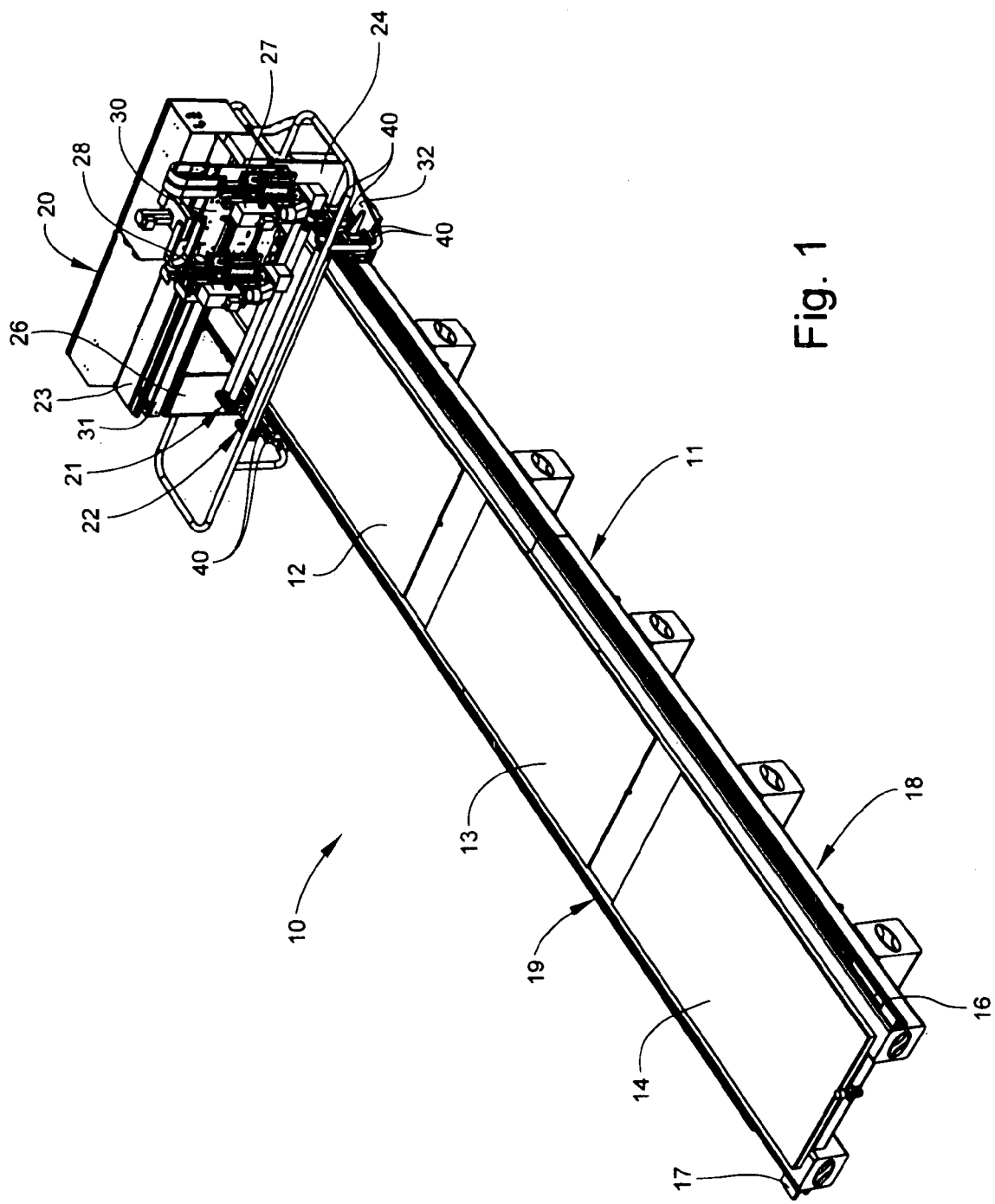
FIG. 1 is a perspective view of a three table router according to an embodiment of the invention.

Referring now specifically to the drawings, a three table router according to an embodiment of the invention is illustrated in FIG. 1 and shown generally at reference numeral 10. The routing machine 10 is preferably computer numerically controlled (CNC) and includes a base member 11 having multiple stationary worktables 12, 13, and 14 mounted thereon, and a pair of trackways 16 and 17 mounted on opposing sides 18 and 19 of and parallel to a longitudinal axis of the base member 11. As illustrated, the routing machine 10 includes three worktables 12, 13 and 14, but may include two or more worktables. The routing machine 10 also includes a gantry 20 and a pair of spaced-apart hold-down assemblies 21 and 22.

Figure 2:
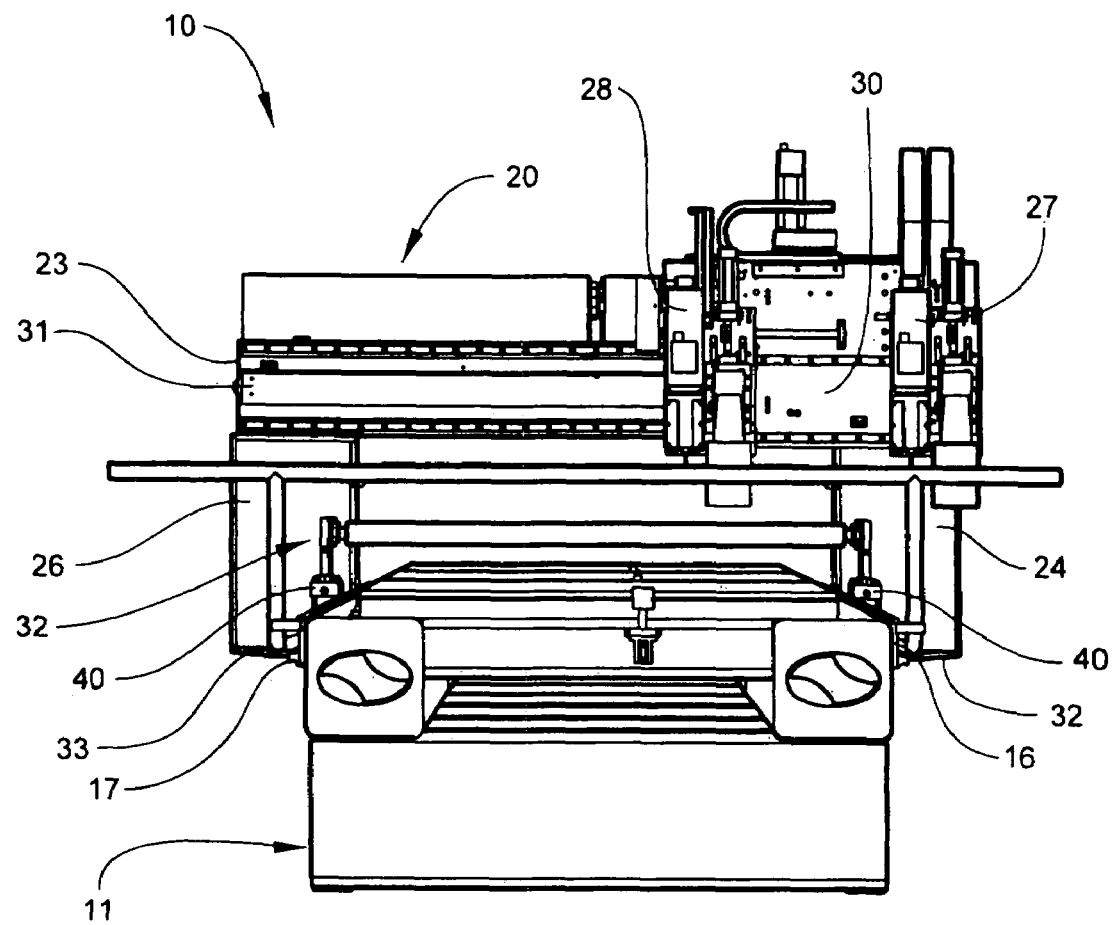
FIG. 2 is an end view of the three table router of FIG. 1.

Referring to FIG. 2, the gantry 20 includes a transverse beam section 23, a pair of spaced-apart leg sections 24 and 26, tool head assemblies 27 and 28 supported on a tool head support assembly 30, and a rail assembly 31 for allowing the tool head support assembly 30 to traverse the base member 11 along the beam section 23. As shown, the leg sections 24 and 26 straddle the base member 11 and cooperate with the trackways 16 and 17 to allow the gantry 20 to move along the longitudinal axis of the base member 11. The routing machine 10 may also be made with a stationary gantry and moving worktables.

Figure 3:
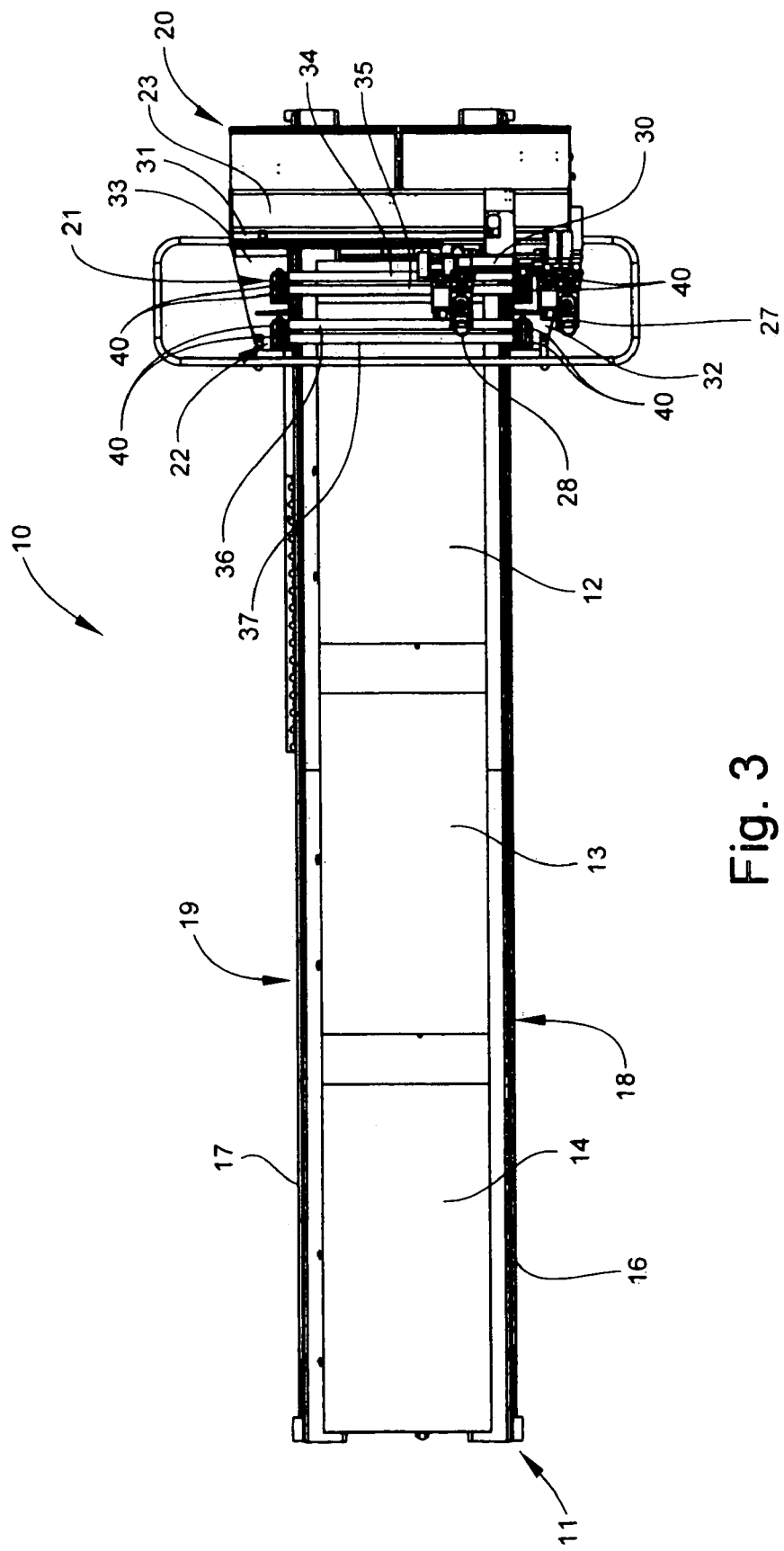
FIG. 3 is a top plan view of the three table router of FIG. 1.

As shown in FIG. 3, the hold-down assemblies 21 and 22 are mounted on platforms 32 and 33 connected to leg sections 24 and 26, respectively. The hold-down assemblies 21 and 22 are positioned below the tool head assemblies 27 and 28 and spaced such that the tool head assemblies 27 and 28 may perform a routing operation on a workpiece positioned on a respective one of the worktables 12-14 between the hold-down assemblies 21 and 22.

Each of the hold-down assemblies 21 and 22 includes a pair of rollers 34, and 36, 37 for holding a workpiece against the worktables 12-14 during the routing operation. The worktables 12-14 may also incorporate a vacuum to assist in holding a workpiece. Each of the rollers 34, 35 and 36, 37 are rotatably connected to an actuation means, such as hydraulic or pneumatic cylinders 40. The cylinders 40 raise and lower the rollers 34, 35 and 36, 37 between a contact position and a non-contact position, as shown in FIG. 2. For example, the rollers 34, 35 and 36, 37 are lowered into a contact position at the start of each of the worktables 12-14 and then raised to a non-contact position at the end of each of the worktables 12-14.

Figure 4:
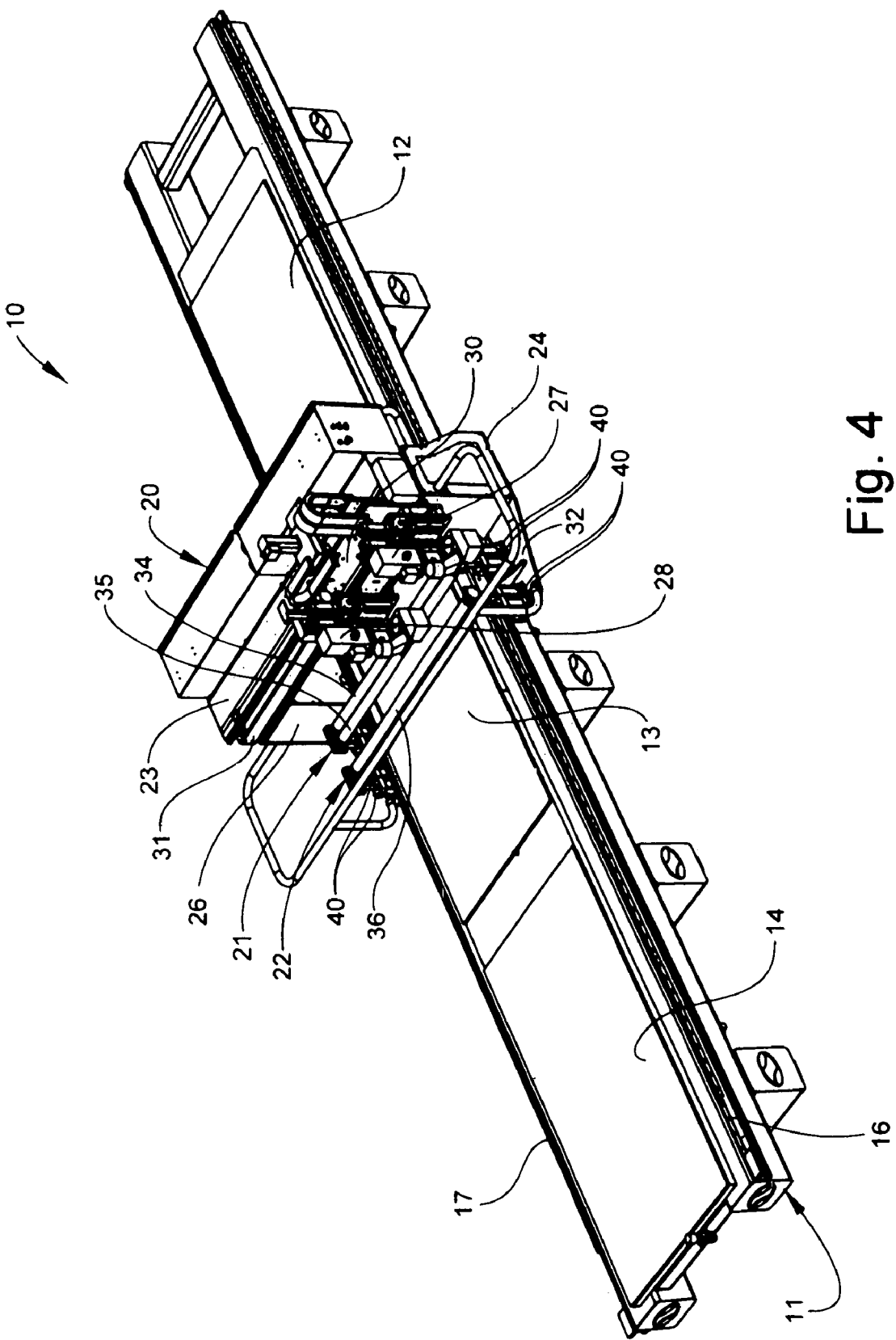
FIG. 4 shows a gantry of the three table router of FIG. 1 positioned for performing a routing operation at a second worktable.

Referring to FIG. 4, in use, the gantry 20 moves along the base assembly 11 from one worktable to the next. Once the toolhead assemblies 27 and 28 have finished a routing process on a workpiece positioned on worktable 12, the gantry 20 moves along the longitudinal axis of the base assembly 11 to the worktable 13 to perform a routing process on a second workpiece. As the tool head assemblies 27 and 28 begin the routing process on the second workpiece, the finished workpiece positioned on worktable 12 may be removed and a new workpiece positioned on the worktable 12. This process continues, allowing finished workpieces to be removed from and new workpieces to be positioned on the worktables 12-14 as the gantry 20 moves continuously from one worktable to the next, thereby increasing productivity.

A three table routing machine with roller hold-down is described above. Various details of the invention may be changed without departing from its scope. Furthermore, the foregoing description of the preferred embodiments of the invention and best mode for practicing the invention are provided for the purpose of illustration only and not for the purpose of limitation.

I claim:

1. A routing machine, comprising:
   (a) a plurality of worktables for supporting at least a first workpiece and a second workpiece;
   (b) a toolhead assembly for first machining the first workpiece on one of the worktables and then machining the second workpiece on another of the worktables, the toolhead assembly being carried by a gantry including a pair of spaced-apart leg sections straddling the worktables and cooperating with a pair of opposing trackways for moving the gantry along a longitudinal axis of the worktables; and
   (c) a hold down assembly for traversing the worktables with the toolhead assembly to retain the first workpiece on the one worktable and then retain the second workpiece on the other worktable such that the first workpiece on the one worktable can be removed and replaced with a new workpiece while the toolhead assembly machines the second workpiece on the other table, the hold down assembly including four freely rotatable rollers each spaced from one another in the direction of the longitudinal axis of the worktables and wherein the toolhead assembly performs the machining operations between the second and third of the four rollers.

2. The routing machine according to claim 1 wherein rotation axes of the rollers extend generally perpendicularly to the longitudinal axis of the worktables.

3. The routing machine according to claim 1 wherein the rollers are rotatably connected to actuation means for raising and lowering the rollers.

4. The routing machine according to claim 1 wherein the hold down assembly is mounted on a platform connected to one of the leg sections.

5. The routing machine according to claim 1 wherein the worktables are stationary work tables.

6. The routing machine according to claim 1, wherein the gantry includes a beam supported on opposing sides by the pair of spaced-apart leg sections.

7. The routing machine according to claim 6 wherein the spaced-apart leg sections straddle a base member on which the worktables are mounted.

8. A routing machine, comprising:
  (a) first, second, and third worktables disposed end to end on a base member for supporting first, second, and third workpieces;
  (b) a gantry including a pair of spaced-apart leg sections straddling the base member and cooperating with a pair of opposing trackways for moving the gantry back and forth along a longitudinal axis of the base member to traverse the worktables, and a toolhead assembly carried by the gantry for machining the first workpiece on the first worktable, machining the second workpiece on the second worktable and then machining the third workpiece on the third worktable; and
  (c) a pair of opposing hold down assemblies, each including a pair of freely rotatable rollers rotatably connected to actuation means for raising and lowering the rollers with respect to the worktables to retain the workpieces on the worktables, the rollers each being spaced from one another in the direction of the longitudinal axis of the base member, the hold down assemblies being configured for traversing the worktables with the toolhead assembly disposed between the pairs of rollers to first retain the first workpiece on the first worktable and then retain the second workpiece on the second worktable such that the first workpiece can be removed from the first worktable and replaced with a different workpiece while the toolhead assembly machines the second workpiece on the second worktable.

9. The routing machine according to claim 8 wherein rotation axes of the rollers extend generally perpendicularly to the longitudinal axis of the base member.

10. The routing machine according to claim 8 wherein each hold down assembly is mounted on a platform.

11. The routing machine according to claim 10 wherein the worktables are stationary tables.

12. A method of machining parts comprising the steps of:
  (a) providing a routing machine, comprising:
    (i) first, second, and third worktables disposed end to end on a base member for supporting first, second, and third workpieces;
    (ii) a gantry including a pair of spaced-apart leg sections straddling the base member and cooperating with a pair of opposing trackways for moving the gantry back and forth along a longitudinal axis of the base member to traverse the worktables, and a toolhead assembly carried by the gantry for machining the first workpiece on the first worktable, machining the second workpiece on the second worktable and then machining the third workpiece on the third worktable; and
    (iii) a pair of opposing hold down assemblies, each including a pair of freely rotatable rollers rotatably connected to actuation means for raising and lowering the rollers with respect to the worktables to retain the workpieces on the worktables, the rollers each being spaced from one another in the direction of the longitudinal axis of the base member, the hold down assemblies being configured for traversing the worktables with the toolhead assembly disposed between the pairs of rollers to first retain the first workpiece on the first worktable and then retain the second workpiece on the second worktable such that the first workpiece can be removed from the first worktable and replaced with a different workpiece while the toolhead assembly machines the second workpiece on the second worktable
  (b) retaining the first workpiece in position on the first worktable with the pair of hold down assemblies;
  (c) machining the first workpiece with the toolhead assembly;
  (d) retaining the second workpiece in position on the second worktable with the pair of hold down assemblies; and
  (e) machining the second workpiece with the toolhead assembly while replacing the first workpiece with a different workpiece.

13. The method according to claim 12 further comprising the step of retaining the third workpiece in position on the third worktable with the hold down assemblies.

14. The method according to claim 13 further comprising the step of machining the third workpiece with the toolhead assembly while replacing the second workpiece with a different workpiece.

15. The method according to claim 14 further comprising the step of machining the different workpiece with the toolhead assembly while replacing the third workpiece.

* * * * *